US009124322B2

(12) United States Patent
Yang et al.

(10) Patent No.: US 9,124,322 B2
(45) Date of Patent: *Sep. 1, 2015

(54) METHOD AND APPARATUS FOR CONSTRUCTING CODEBOOK, AND METHOD, APPARATUS AND SYSTEM FOR PRECODING (71) Applicant: ALCATEL LUCENT, Boulogne Billancourt (FR)

(72) Inventors: Hongwei Yang, Shanghai (CN); Dong Li, Shanghai (CN); Keying Wu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,976

(22) Filed: May 2, 2014

(65) Prior Publication Data
US 2014/0241452 A1    Aug. 28, 2014

Related U.S. Application Data (63) Continuation of application No. 13/390,796, filed as application No. PCT/CN2009/073278 on Aug. 18, 2009, now Pat. No. 8,737,525.

(51) Int. Cl.
*H04B 7/02*  (2006.01)
*H04B 7/04*  (2006.01)
*H04L 25/03* (2006.01)

(52) U.S. Cl.
CPC ............ *H04B 7/0473* (2013.01); *H04B 7/0413* (2013.01); *H04L 25/03898* (2013.01); *H04L 25/03961* (2013.01)

(58) Field of Classification Search
USPC .................. 375/260, 267, 285, 295, 299; 455/68–69
See application file for complete search history.

(56) References Cited

U.S. PATENT DOCUMENTS 8,194,778 B2    6/2012  Ko et al.
2008/0063115 A1 3/2008  Varadarajan et al.
(Continued)

FOREIGN PATENT DOCUMENTS

CN    101212281 A    7/2008
CN    101510820 A    8/2009
(Continued)

OTHER PUBLICATIONS

Huawei, "DL MIMO Codebook," 3GPP TSG RAN WG1#56bis, R1-091281, Seoul, Republic of Korea, Mar. 23, 2009 to Mar. 27, 2009, Document for: Discussion and Decision.
(Continued)

*Primary Examiner* — Khanh C Tran
(74) *Attorney, Agent, or Firm* — Fay Sharpe LLP (57) ABSTRACT The present invention discloses a method and apparatus for constructing a codebook. The method comprises: receiving grouping information on a plurality of transmit antennas of a base station; obtaining a channel model for a channel between a mobile terminal and the base station; and determining an optimal precoding matrix corresponding to each antenna group according to the grouping information and the channel model, so as to construct a codebook used for precoding. The present invention further discloses a method and apparatus for selecting a precoding matrix, as well as a method, apparatus and system for precoding.

2 Claims, 4 Drawing Sheets (56) References Cited

U.S. PATENT DOCUMENTS

| | | | |
|---|---|---|---|
| 2008/0232501 A1* | 9/2008 | Khojastepour et al. | 375/267 |
| 2008/0317145 A1 | 12/2008 | Clerckx et al. | |
| 2009/0322613 A1 | 12/2009 | Bala et al. | |
| 2010/0020709 A1 | 1/2010 | Ohm | |
| 2011/0096658 A1* | 4/2011 | Yang et al. | 370/210 |
| 2011/0211651 A1* | 9/2011 | Khojastepour | 375/295 |
| 2012/0063538 A1* | 3/2012 | Khojastepour | 375/295 |
| 2014/0086190 A1* | 3/2014 | Shimanuki | 370/329 |

FOREIGN PATENT DOCUMENTS

| | | |
|---|---|---|
| CN | 101621360 A | 1/2010 |
| KR | 20080022031 A | 3/2008 |
| WO | 2008/030035 A2 | 3/2008 |
| WO | 2008/031037 A2 | 3/2008 |
| WO | 2008/133582 | 11/2008 |
| WO | 2009/084921 | 7/2009 |

OTHER PUBLICATIONS

International Search Report for PCT/CN2009/073278 dated May 20, 2010.

Supplemental European Search Report, Date Mar. 1, 2013, Application No. 09848367.0-1237 / 2469747 PCT/CN2009073278, Date of completion of search Dec. 18, 2012, 11 pgs.

Texas Instruments, "Joint Processing Downlink COMP Precoding Support" 3GPP TSG RAN WG1 #56, Athens, Greece, Feb. 9-13, 2009; R1-090585, 6 pgs.

Nortel, "Link Level Evaluation on Adaptive Beaming Forming" 3GPP TSG-RAN Working Group 1 Meeting #50bis, Shanghai, China, Oct. 8-12, 2007, R1-073958, pp. 1-15.

Texas Instruments, "Aspects of Coordinated Multi-point Transmission for Advanced E-UTRA" 3GPP TSG RAN WG1 #55, Prague, Czech Republic, Nov. 11-15, 2008, R1-084444, 4 pgs.

InterDigital, "Analysis of Feedback mechanisms for CoMP" 3GPP TSG RAN WG1 Meeting #57bis, Los Angeles, USA, Jun. 29-Jul. 3, 2009, pp. 1-10.

Varadarajan B. et al., "Nested codebook design for MIMO precoders" Signals, Systems and Computers, Oct. 26, 2008, XP031475379, IEEE, Piscataway, NJ, pp. 723-727.

Texas Instruments, "Progressing on 4Tx Codebook Design for Uplink SU-MIMO" 3GPP TSG RAN WG1 57, San Francisco, May 4-8, 2009, R1-092234, pp. 1-4.

Catt, "Link level simulation results for non-codebook based precoding in EUTRA TDD (GBF)", 3GPP TSG RAN WG1 Meeting #47bis, Sorrento, Italy, Jan. 15-19, 2007, R1-070294, 3 pgs.

* cited by examiner

METHOD AND APPARATUS FOR CONSTRUCTING CODEBOOK, AND METHOD, APPARATUS AND SYSTEM FOR PRECODING

FIELD OF THE INVENTION

The present invention generally relates to precoding technology, and more specifically to codebook construction, as well as a codebook-based precoding method, apparatus and system.

BACKGROUND OF THE INVENTION

Precoding technology is applied more and more widely in wireless communication systems. Precoding technology is such that data is first precoded for channel loss compensation and then sent for better adapting to channel conditions, whereby the data transmission quality and/or throughput is improved.

At present, precoding technology can be divided into two categories. Take downlinks as an example. One category is such that a serving base station of a mobile terminal obtains channel information on a downlink multi-input multi-output (MIMO) channel through pilot signals and so on, and then the serving base station calculates a precoding matrix and sends data subsequent to precoding the data. The other is a codebook-based precoding method wherein a mobile terminal obtains channel information on a downlink MIMO channel through downlink pilots, preambles or midambles sent by a base station, then selects an index of the optimal precoding matrix from a codebook comprising a plurality of precoding matrixes and feeds the index back to a serving base station that sends data subsequent to precoding the data.

The issue of codebook construction is quite important in codebook-based precoding methods. There are currently two categories of codebook construction methods. One category is unstructured codebook construction, and the other is structured codebook construction. Generally speaking, a structured codebook is more popular in terms of lower construction complexity, better scalability and performances than an unstructured codebook. Description is presented to the construction of a structured codebook in the documents DFT based codebook (B. M. Hochwald, et al. 'Systematic design of unitary space-time constellations', IEEE Trans. Information Theory, Vol. 46, No. 6, 2000), Householder based codebook (IEEE C802.16e-04/527r4, 'Improved feedback for MIMO precoding', Intel, IEEE 802.16, Nov. 12, 2004) or Givens transformation based codebook (R1-070728, 'Proposed way forward on codebook design for E-UTRA', TI etc., 3GPP TSG RAN WG1 #48, February 2007).

However, the complexity, scalability and performance of the structured codebook depend on the number of transmit antennas; the larger the number of transmit antennas or base stations, the worse the flexibility of the structure codebook construction. Therefore, there is a need for a better codebook construction method to adapt to the increasing number of transmit antennas or base stations and precode data using the codebook.

SUMMARY OF THE INVENTION

In view of the foregoing problems, the present invention provides a method and apparatus for constructing a codebook, as well as a method, apparatus and system for codebook-based precoding.

According to a first aspect of the present invention, there is provided a method for constructing a codebook, the method comprising the steps of: receiving grouping information on a plurality of transmit antennas of a base station; obtaining a channel model for a channel between a mobile terminal and the base station; and determining an optimal precoding matrix corresponding to each antenna group according to the grouping information and the channel model, so as to construct a codebook used for precoding.

According to a second aspect of the present invention, there is provided an apparatus for constructing a codebook, the apparatus comprising: receiving means for receiving grouping information on a plurality of transmit antennas of a base station; channel model obtaining means for obtaining a channel model for a channel between a mobile terminal and the base station; and precoding matrix determining means for determining an optimal precoding matrix corresponding to each antenna group according to the grouping information and the channel model, so as to construct a codebook used for precoding.

According to a third aspect of the present invention, there is provided a method for selecting a precoding matrix, the method comprising the steps of: receiving grouping information on a plurality of transmit antennas of a base station; estimating a channel from the base station to obtain a channel model; selecting from a codebook an optimal precoding matrix corresponding to each antenna group, based on the grouping information and the channel model; and sending an index of each optimal precoding matrix to the base station so that the base station performs concatenated precoding.

According to a fourth aspect of the present invention, there is provided an apparatus for selecting a precoding matrix, the apparatus comprising: receiving means for receiving grouping information on a plurality of transmit antennas of a base station; channel model obtaining means for estimating a channel from the base station to obtain a channel model; precoding matrix selecting means for selecting from a codebook an optimal precoding matrix corresponding to each antenna group, based on the grouping information and the channel model; and sending means for sending an index of each optimal precoding matrix to the base station so that the base station performs concatenated precoding.

According to a fifth aspect of the present invention, there is provided a method for precoding, the method comprising the steps of: constructing a concatenated precoding matrix according to indices of a plurality of optimal precoding matrixes received from a mobile terminal; precoding data using the constructed concatenated precoding matrix; and sending the precoded data to the mobile terminal.

According to a sixth aspect of the present invention, there is provided an apparatus for precoding, the apparatus comprising: constructing means for constructing a concatenated precoding matrix according to indices of a plurality of optimal precoding matrixes received from a mobile terminal; precoding means for precoding data using the constructed concatenated precoding matrix; and sending means for sending the precoded data to the mobile terminal.

According to a seventh aspect of the present invention, there is provided a communication system, comprising an apparatus for selecting a precoding matrix and an apparatus for precoding.

BRIEF DESCRIPTION OF THE DRAWINGS

The other objects and effects of the present invention will become more apparent and easier to understand from the following description of specific embodiments illustrating principles of the present invention, when taken in conjunction with the accompanying drawings wherein.

The same reference numerals denote like, similar or corresponding features or functions throughout the foregoing figures.

DETAILED DESCRIPTION OF EMBODIMENTS

The present invention is now explained and illustrated in more detail with reference to the accompanying drawings. It should be understood that the figures and embodiments of the present invention are only for illustration purposes and not for limiting to protection scope of the present invention.

In the present invention, a codebook is a set of precoding matrixes. In the codebook, each precoding matrix corresponds to an index via which a corresponding precoding matrix is found. The codebook may be prestored in a mobile station and a base station according to standards or sent to a mobile station or a base station by signaling.

For illustration purposes, in specific embodiments of the present invention, in single-BS MIMO a base station has 4 transmit antennas, while in multi-BS MIMO there are 2 base stations each having 2 transmit antennas, and a mobile terminal has 2 receive antennas. A channel model from the base station to the mobile terminal is H. In multi-BS MIMO, for the case where more than two base stations jointly serve one mobile station, it is well within reach of those skilled in the art by simply extending the following embodiment according to the present invention. It should be pointed out that the two base stations used in the embodiment of multi-BS MIMO of the present invention are only for illustration purposes and should not be construed as limiting the present invention.

Figure 1:
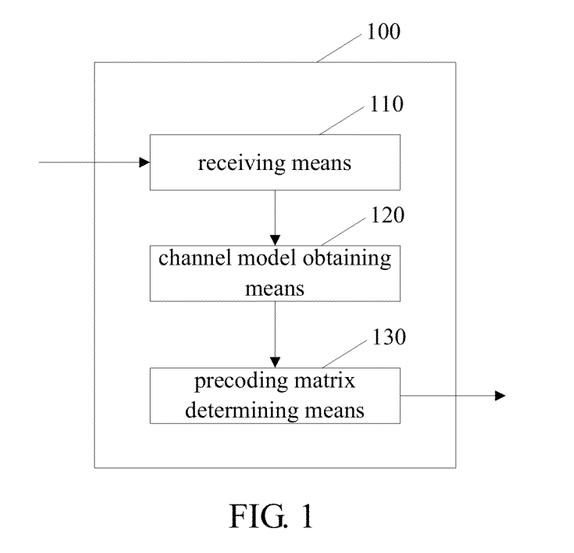
FIG. 1 is a block diagram of an apparatus for constructing a codebook according to the present invention.

FIG. 1 is a block diagram of an apparatus for constructing a codebook according to the present invention. In FIG. 1, an apparatus 100 determines a precoding matrix corresponding to each transmit antenna group according to grouping information on transmit antennas of a base station and a channel model, and constructs a codebook using the determined precoding matrix. Specifically, the apparatus 100 comprises: receiving means 110, channel model obtaining means 120 and precoding matrix determining means 130. Among them, the receiving means 110 is configured for receiving grouping information on a plurality of transmit antennas of the base station; the channel model obtaining means 120 is configured for obtaining a channel model for a channel between a mobile station and the base station; the precoding matrix determining means 130 is configured for determining a precoding matrix corresponding to each transmit antenna group according to the grouping information and the channel model, so as to construct a codebook used for precoding.

In an embodiment, the precoding matrix determining means 130 further comprises means for applying the grouping information and the channel model to predetermined criteria so as to determine the optimal precoding matrix that satisfies the predetermined criteria.

In another embodiment, the precoding matrix determining means 130 further comprises: means for calculating, according to the grouping information and the channel model, a precoding matrix that makes a Chordal distance, a projection two-norm distance or a Fubini-Study distance be minimum; and means for determining the precoding matrix that makes the distance be minimum as the optimal precoding matrix.

Figure 2:
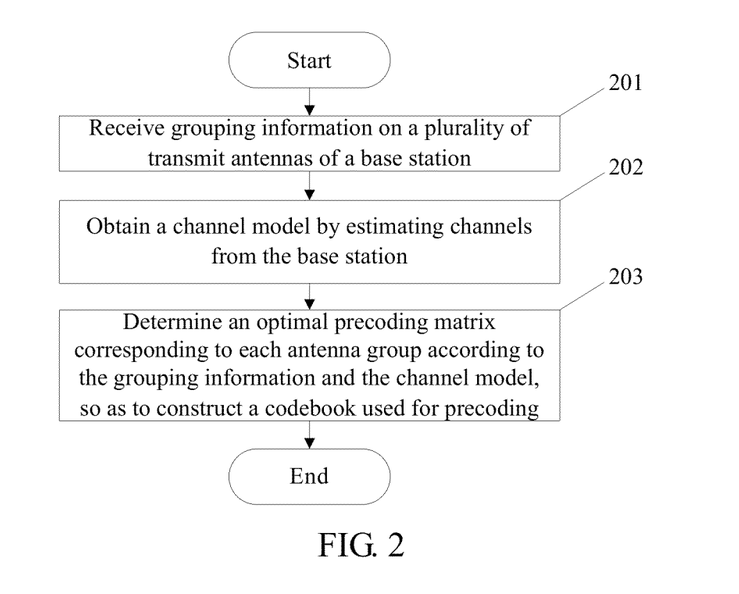
FIG. 2 is a flowchart of a method for constructing a codebook according to the present invention.

FIG. 2 illustrates a flowchart of a method for constructing a codebook. It should be pointed out that steps in FIG. 2 may be performed by the corresponding means in FIG. 1, respectively.

In step 201, grouping information on a plurality of transmit antennas of a base station is received.

The method for constructing a codebook of the present invention may be applied to both single-BS MIMO and multi-BS MIMO. In this embodiment, single-BS MIMO with 4 transmit antennas is assumed. Besides, it is assumed that the 4 transmit antennas of the base station is divided into 2 groups each having 2 antennas. It should be pointed out that in actual applications, the method of the present invention is not limited to only a single base station with 4 antennas but may be applied to a single base station with more transmit antennas or to multiple base stations.

In an embodiment, the grouping information includes the number of base stations in the MIMO system, the number of transmit antennas at each base station, the number of groups resulting from grouping the antennas of the base station, the number of antennas in each group, etc.

In the present invention, the antennas of the base station are grouped in various manners. For example, when the system comprises only one base station and the base station has 4 transmit antennas, the antennas may be equally divided into 2 groups each having 2 antennas; at this point, the antennas may also be unequally divided into 2 groups, one of which has 3 antennas while the other of which has only 1 antenna. When the system comprises a plurality of base stations, 2 BSs for example, and each base station has 2 transmit antennas, 2 antennas at each base station may be divided into a group whereby 2 antenna groups are obtained; at this point, one of antennas at each base station may be taken as a group whereby 2 antenna groups are obtained.

In the present invention, various manners of grouping antennas exist and are feasible so long as the number of antennas of each group is not too large. Only by making the number of antennas of each group less than the total number of antennas, is it possible to reduce the size of a corresponding precoding matrix and further improve the flexibility of precoding.

The grouping information is stored in a hard disk or a removable memory like an optical disk or a floppy disk, downloaded via the Internet or other computer, or determined in real time by an apparatus during execution of the method illustrated in FIG. 2.

In step 202, a channel model for a channel between a mobile terminal and the base station is obtained.

In the embodiments of the present invention, the channel model is prestored in a hard disk or memory like an optical disk or a floppy disk, or is downloaded via the Internet or other computer.

In an embodiment, the channel model is represented using a channel matrix H. Now that in the prior art there are a variety of methods for estimating a channel model, those skilled in the art may easily obtain a channel matrix according to the prior art, and thus details are omitted here.

In step 203, the optimal precoding matrix corresponding to each antenna group is determined according to the grouping information obtained in step 201 and the channel model obtained in step 202, so as to construct a codebook used for precoding.

In an embodiment, during the process of determining the optimal precoding matrix corresponding to each antenna group, the grouping information and the channel model are applied to predetermined criteria to determine the optimal precoding matrix that satisfies the predetermined criteria.

In an embodiment, the process of determining the optimal precoding matrix corresponding to each antenna group is described as below: calculating, according to the grouping information and the channel model, a precoding matrix that makes a Chordal distance, a projection two-norm distance or a Fubini-Study distance be minimum, and determining the precoding matrix that makes the distance be minimum as the optimal precoding matrix.

In an embodiment, the predetermined criteria are selected depending on receiver architecture (Minimum Mean Square Error MMSE, Maximum Likelihood ML, etc.) and performance metric (capacity, bit error rate, etc.) (see D. J. Love, et al. 'Limited feedback unitary precoding for spatial multiplexing systems', IEEE Trans. On Information Theory, Vol. 51, No. 8, 2005).

In an embodiment, the predetermined criteria are selected to minimize the Euclidian distance (equivalent to maximizing the minimum singular value). When MMSE detecting is used at a receiver, first a group of precoding matrixes corresponding to respective antenna groups is set (the index of such precoding matrixes is equal to that of antenna groups), a concatenated precoding matrix is obtained according to the respective precoding matrixes, and a product matrix of the channel matrix and the concatenated precoding matrix is calculated to obtain the minimum singular value of the product matrix; then, precoding matrixes corresponding to respective antenna groups are reset, the foregoing process is repeated, a plurality of minimum singular values resulting from times of setting are compared to determine the maximum one of the plurality of minimum singular values, and finally a precoding matrix corresponding to the maximum minimum singular value is obtained as the optimal precoding matrix.

Expression $$\underset{\hat{W}^m \in \hat{W}, \hat{W}^n \in \hat{W}}{\operatorname{argmax}} \lambda_{min}\{H\tilde{W}\}$$

describes the foregoing process, where $\lambda_{min}\{\bullet\}$ is an operator calculating the minimum singular value, $\hat{W}^m$ and $\hat{W}^n$ represent two precoding matrixes, $\tilde{W}$ represents the concatenated precoding matrix obtained according to $\hat{W}^m$ and $\hat{W}^n$, and H is a matrix representing the channel model.

In an embodiment, the concatenated precoding matrix obtained from respective precoding matrixes is achieved by directly combining the respective precoding matrixes into a large precoding matrix. For example, when there are 2 antenna groups, precoding matrixes corresponding to the antenna groups also total 2, e.g., represented by $\hat{W}^1$ and $\hat{W}^2$ respectively, where $$\hat{W}^1 = \begin{bmatrix} \hat{w}_1^1 \\ \hat{w}_2^1 \\ \vdots \\ \hat{w}_n^1 \end{bmatrix}, \hat{W}^2 = \begin{bmatrix} \hat{w}_1^2 \\ \hat{w}_2^2 \\ \vdots \\ \hat{w}_m^2 \end{bmatrix},$$

and a combination of $\hat{W}^1$ and $\hat{W}^2$ is $$\tilde{W} = \begin{bmatrix} \hat{w}_1^1 \\ \hat{w}_2^1 \\ \vdots \\ \hat{w}_n^1 \\ \hat{w}_1^2 \\ \hat{w}_2^2 \\ \vdots \\ \hat{w}_m^2 \end{bmatrix}.$$

$\tilde{W}$ shown above is the concatenated precoding matrix obtained according to $\hat{W}^1$ and $\hat{W}^2$. In an embodiment, the concatenated precoding matrix $\tilde{W}$ is weighted to satisfy the normalization requirement, e.g., multiplying the concatenated precoding matrix $\tilde{W}$ by a weighting coefficient $\sqrt{2}/2$. In another embodiment, the plurality of precoding matrixes $\hat{W}^1$ and $\hat{W}^2$ are weighted respectively, and then the plurality of weighted precoding matrixes are combined into a concatenated precoding matrix.

By means of the method illustrated in FIG. 2, a codebook containing precoding matrixes is obtained, where each precoding matrix corresponds to a unique index. In this codebook, a corresponding precoding matrix can be found according to the index. In an embodiment, the codebook is stored respectively in the base station and the mobile terminal of the communication system so that the base station and the mobile terminal can synchronously select precoding matrixes. For example, when the mobile terminal sends to the base station an index of a precoding matrix, the base station can find a codebook according to the index and thus determine which precoding matrix the mobile terminal wants the base station to use.

In an embodiment, the codebook obtained according to the codebook construction method as illustrated in FIG. 2 is respectively stored in the mobile terminal and the base station, so that the mobile terminal and the base station have the same codebook and can synchronously select precoding matrixes.

In the present invention, the apparatus illustrated in FIG. 1 and for executing the codebook construction method of FIG. 2 may be a mobile terminal, a base station, or other server in a communication system, etc.

If the apparatus is a mobile terminal, the mobile terminal stores a codebook in itself while constructing the codebook, and sends the constructed codebook to a base station so that the mobile terminal and the base station have the same codebook.

If the apparatus is a base station, the base station stores a codebook in itself while constructing the codebook, and sends the constructed codebook to a mobile terminal so that the base station and the mobile terminal have the same codebook.

If the apparatus is a server in a communication system other than a mobile terminal and a base station, a codebook constructed by the server is respectively sent to a mobile terminal and a base station so that the mobile terminal and the base station have the same codebook.

Figure 3:
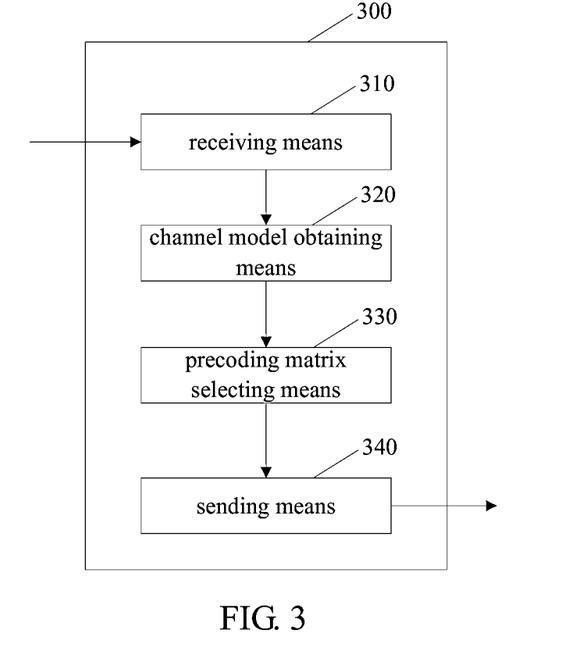
FIG. 3 is a block diagram of an apparatus for selecting a precoding matrix according to the present invention.

FIG. 3 illustrates a block diagram of an apparatus 300 for selecting a precoding matrix according to the present invention. The apparatus 300 comprises: receiving means 310, channel model obtaining means 320, precoding matrix selecting means 330 and sending means 340. Among them, the receiving means 310 is for receiving grouping information on a plurality of transmit antennas of a base station; the channel model obtaining means 320 is for estimating a channel from the base station so as to obtain a channel model; the precoding matrix selecting means 330 is for selecting from a codebook the optimal precoding matrix corresponding to each antenna group, based on the channel model; the sending means 340 is for sending an index of each optimal precoding matrix to the base station so that the base station can perform concatenated precoding.

In an embodiment, the precoding matrix selecting means 330 further comprises: means for applying the grouping information and the channel model to predetermined criteria so as to determine a precoding matrix that satisfies the predetermined criteria; and means for retrieving in the codebook a precoding matrix that matches the precoding matrix satisfying the predetermined criteria, as the optimal precoding matrix.

In an embodiment, the means comprised in the precoding matrix selecting means 330 and for applying the grouping information and the channel model to predetermined criteria so as to determine a precoding matrix that satisfies the predetermined criteria further comprises: means for calculating, according to the grouping information and the channel model, a precoding matrix that makes a Chordal distance, a projection two-norm distance or a Fubini-Study distance be minimum; and means for determining the precoding matrix that makes the distance be minimum as the optimal precoding matrix.

In an embodiment, the apparatus illustrated in FIG. 3 and for selecting a precoding matrix according to the present invention is a mobile terminal.

Figure 4:
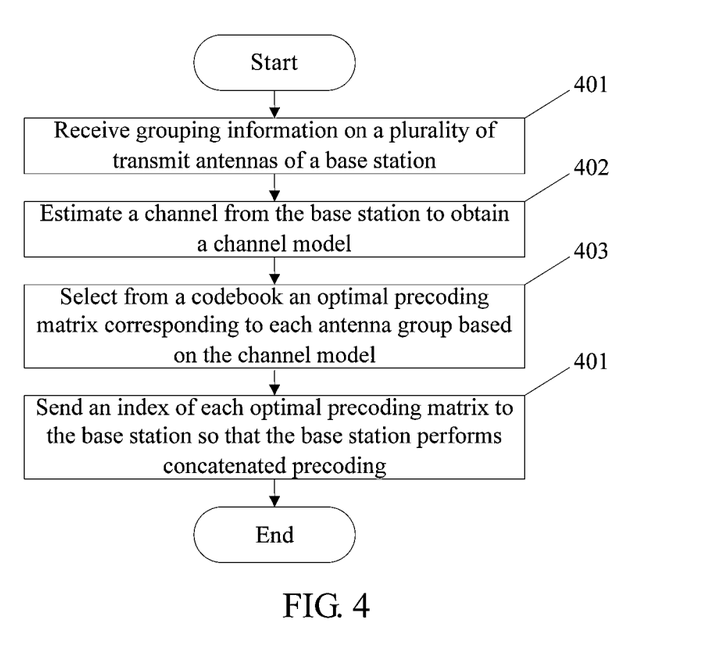
FIG. 4 is a flowchart of a method for selecting a precoding matrix according to the present invention.

FIG. 4 illustrates a flowchart of a method for selecting a precoding matrix according to the present invention. It should be pointed out that steps in FIG. 4 may be performed by the corresponding means in FIG. 3, respectively.

In step 401, grouping information on a plurality of transmit antennas of a base station is received.

The method for constructing a codebook of the present invention may be applied to both single-BS MIMO and multi-BS MIMO. In this embodiment, single-BS MIMO with 4 transmit antennas is assumed. Besides, it is assumed that the 4 transmit antennas of the base station is divided into 2 groups each having 2 antennas. It should be pointed out that in real applications, the method of the present invention is not limited to only a single base station with 4 antennas but may be applied to a single base station with more transmit antennas or to multiple base stations.

In an embodiment, the grouping information includes the number of base stations in the MIMO system, the number of transmit antennas at each base station, the number of groups resulting from dividing the antennas of the base station, and the number of antennas in each group.

In an embodiment, the antennas of the base station are grouped in various manners. For example, when the system comprises only one base station and the base station has 4 transmit antennas, the antennas may be equally divided into 2 groups each having 2 antennas; at this point, the antennas may also be unequally divided into 2 groups, one of which has 3 antennas while the other of which has only 1 antenna. When the system comprises a plurality of base stations, 2 BSs for example, and each base station has 2 transmit antennas, 2 antennas at each base station may be divided into a group whereby 2 antenna groups are obtained; at this point, one of antennas at each base station may be taken as a group whereby 2 antenna groups are obtained.

In the present invention, various manners of grouping antennas exist and are feasible so long as the number of antennas of each group is not too large. Only by making the number of antennas of each group less than the total number of antennas, is it possible to reduce the size of a corresponding precoding matrix and further improve the flexibility of precoding.

In the present invention, the grouping information is stored in a hard disk or a removable memory like an optical disk or a floppy disk, downloaded via the Internet or other computer, or determined in real time by an apparatus during execution of the method illustrated in FIG. 4.

In step 402, a channel from the base station is estimated to obtain a channel model.

In an embodiment, the channel model is represented using a channel matrix H. Now that in the prior art there are a variety of methods for estimating a channel model, those skilled in the art may easily obtain a channel matrix according to the prior art, and thus details are omitted here.

In step 403, the optimal precoding matrix corresponding to each antenna group is selected from a codebook based on the grouping information obtained in step 401 and the channel model obtained in step 402.

In an embodiment, the grouping information and the channel model are applied to predetermined criteria to determine a precoding matrix that satisfies the predetermined criteria.

In an embodiment, a precoding matrix that makes a Chordal distance, a projection two-norm distance or a Fubini-Study distance be minimum is calculated according to the grouping information and the channel model, and subsequently the precoding matrix that makes the distance be minimum is determined as a precoding matrix that satisfies the predetermined criteria.

In an embodiment, the predetermined criteria are selected depending on receiver architecture (Minimum Mean Square Error MMSE, Maximum Likelihood ML, etc.) and performance metric (capacity, bit error rate, etc.).

In an embodiment, assume that MMSE detecting is used at a receiver. First of all, a group of precoding matrixes corresponding to respective antenna groups is set, a concatenated precoding matrix is obtained according to the respective precoding matrixes, and a product matrix of the channel matrix and the concatenated precoding matrix is calculated to obtain the minimum singular value of the product matrix; then, precoding matrixes corresponding to respective antenna groups are reset, the foregoing process is repeated, a plurality of minimum singular values resulting from times of setting are compared to determine the maximum one of the plurality of minimum singular values, and finally a precoding matrix corresponding to the maximum minimum singular value is obtained as the optimal precoding matrix.

In an embodiment, the concatenated precoding matrix obtained from respective precoding matrixes is achieved by directly combining the respective precoding matrixes into a large precoding matrix. In another embodiment, the concatenated precoding matrix is weighted to meet the normalization requirement. In another embodiment, the plurality of precoding matrixes are weighted respectively, and then the plurality of weighted precoding matrixes are combined into a concatenated precoding matrix.

Then, a precoding matrix that matches the precoding matrix satisfying the predetermined criteria is retrieved in a codebook as the optimal precoding matrix. In an embodiment, by comparing the precoding matrix satisfying the predetermined criteria with each of precoding matrixes contained in the codebook, a matrix with the minimum difference is determined and used as a precoding matrix that matches the precoding matrix satisfying the predetermined criteria. In the meanwhile, an index corresponding to the matching precoding matrix is determined.

In an embodiment, the codebook is prestored in a base station and a mobile terminal and the codebook is completely identical. The codebook may be obtained by the method illustrated in FIG. 2 or preset by a user.

In step 404, the index of the optimal precoding matrix is sent to the base station so that the base station can perform concatenated precoding.

Figure 5:
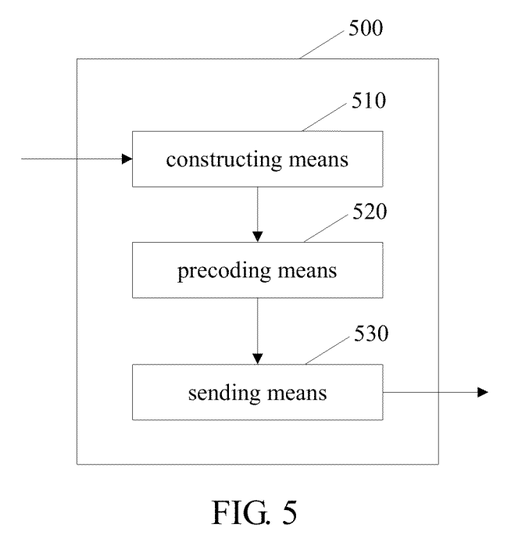
FIG. 5 is a block diagram of an apparatus for precoding according to the present invention.

FIG. 5 illustrates a block diagram of an apparatus 500 for precoding according to the present invention. The apparatus 500 comprises: constructing means 510, precoding means 520 and sending means 530. Among them, the constructing means 510 is for constructing a concatenated precoding matrix according to indices of a plurality of optimal precoding matrixes received from a mobile terminal; the precoding means 520 is for precoding data using the constructed concatenated precoding matrix; and the sending means 530 is for sending the precoded data to the mobile terminal.

In an embodiment, the constructing means 510 further comprises: means for retrieving in a codebook precoding matrixes that correspond to the indices of the plurality of optimal precoding matrixes; and means for combining the plurality of retrieved precoding matrixes into the concatenated precoding matrix.

In an embodiment, the means for combining the plurality of retrieved precoding matrixes into the concatenated precoding matrix further comprises: means for respectively weighting the plurality of retrieved precoding matrixes; and means for combining the plurality of weighted precoding matrixes into the concatenated precoding matrix.

In an embodiment, the means for combining the plurality of retrieved precoding matrixes into the concatenated precoding matrix further comprises: means for weighting the concatenated precoding matrix to achieve normalization.

In an embodiment, the apparatus for precoding according to the present invention as illustrated in FIG. 5 is a base station.

Figure 6:
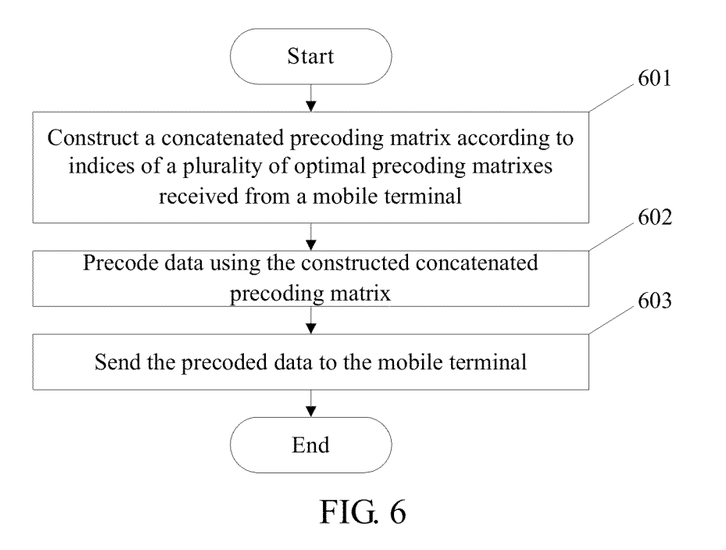
FIG. 6 is a flowchart of a method for precoding according to the present invention.

FIG. 6 illustrates a block diagram of a method for precoding according to embodiments of the present invention. It should be noted that steps in FIG. 6 may be performed by the corresponding means in FIG. 5, respectively.

In step 601, a concatenated precoding matrix is constructed according to indices of a plurality of optimal precoding matrixes received from a mobile terminal.

In an embodiment, precoding matrixes corresponding to the indices of the plurality of optimal precoding matrixes are retrieved in a codebook. For example, in the case of 2 antenna groups, indices of 2 optimal precoding matrixes are received from the mobile terminal. Then, the corresponding 2 precoding matrixes are retrieved in a codebook stored in a base station.

Next, the plurality of retrieved precoding matrixes are combined into a concatenated precoding matrix. In an embodiment, the concatenated precoding matrix obtained from respective precoding matrixes is achieved by directly combining the respective precoding matrixes into a large precoding matrix. For example, when there are 2 antenna groups, precoding matrixes corresponding to the antenna groups also total 2, e.g., represented by $\hat{W}^1$ and $\hat{W}^2$ respectively, where $$\hat{W}^1 = \begin{bmatrix} \hat{w}_1^1 \\ \hat{w}_2^1 \\ \vdots \\ \hat{w}_n^1 \end{bmatrix}, \hat{W}^2 = \begin{bmatrix} \hat{w}_1^2 \\ \hat{w}_2^2 \\ \vdots \\ \hat{w}_m^2 \end{bmatrix},$$

and the combination of $\hat{W}^1$ and $\hat{W}^2$ is $$\tilde{W} = \begin{bmatrix} \hat{w}_1^1 \\ \hat{w}_2^1 \\ \vdots \\ \hat{w}_n^1 \\ \hat{w}_1^2 \\ \hat{w}_2^2 \\ \vdots \\ \hat{w}_m^2 \end{bmatrix}.$$

$\tilde{W}$ shown above is the concatenated precoding matrix obtained according to $\hat{W}^1$ and $\hat{W}^2$.

In an embodiment, the plurality of retrieved precoding matrixes are weighted respectively, and then the plurality of weighted precoding matrixes are combined into a concatenated precoding matrix. For example, the concatenated precoding matrix $\tilde{W}$ is weighted by a weighting coefficient to satisfy the normalization requirement, as shown by the equation:

$$\tilde{W} = \begin{bmatrix} \hat{W}^1 \\ \hat{W}^2 \end{bmatrix} \cdot \frac{\sqrt{2}}{2}.$$

In another embodiment, the concatenated precoding matrix is weighted, e.g., phase and/or amplitude weighted, to satisfy the normalization requirement, as shown by the equation:

$$\tilde{W} = \begin{bmatrix} \cos(\theta) \cdot \hat{W}^1 \\ e^{j\varphi} \cdot \sin(\theta) \cdot \hat{W}^2 \end{bmatrix} \cdot \frac{\sqrt{2}}{2},$$

where, $$\theta \in (0, \frac{\pi}{2}),$$

$\varphi \in (0, 2\pi)$. $\theta$ and $\varphi$ could be quantized at the mobile station according to a certain optimization criteria (e.g., maximizing SINR received at the mobile station). For example, values are taken from value ranges of $\theta$ and $\varphi$ according to uniform quantization. $\hat{W}^1$ and $\hat{W}^2$ are weighted by different values taken within the value ranges of $\theta$ and $\varphi$, so that the concatenated precoding matrix $\tilde{W}$ is determined more flexibly.

In step 602, data is preceded using the constructed concatenated precoding matrix.

Data may be precoded with the concatenated precoding matrix as according to precoding methods in the prior art. For example, the precoding is implemented using ZF (zero-forcing) criteria (see R1-071510, 'Details of Zero-forcing MU-MIMO for DL EUTRA', Freescale Semiconductor Inc., 3GPP TSG RAN WG1 #48bis, March 2007). Those skilled in the art may implement the precoding according to any other available prior art, which is not detailed here.

In step 603, the precoded data is sent to the mobile terminal.

Figure 7:
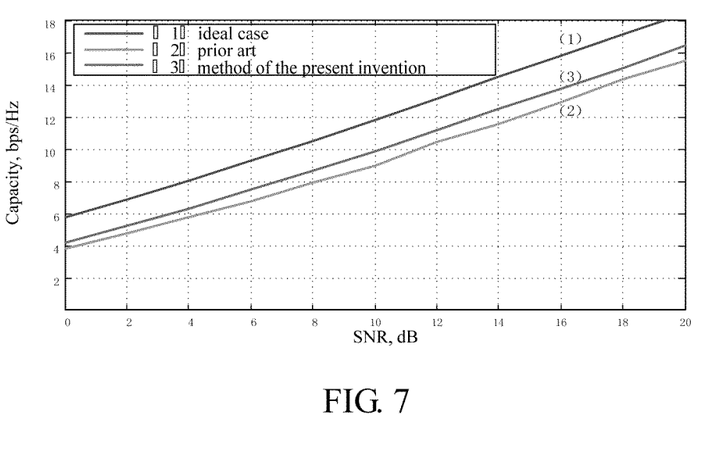
FIG. 7 illustrates a comparison between simulation results of concatenated precoding according to the present invention, ideal precoding and existing precoding technology.

FIG. 7 illustrates a comparison between simulation results of the concatenated precoding according to the present invention, ideal precoding and existing precoding technology. In FIG. 7, the horizontal ordinate denotes signal-to-noise ratio (SNR), and the vertical ordinate denotes capacity, which is for measuring the effectiveness of a system. Capacity, with the unit of bps/Hz, is defined as the number of transmissible bits per second over a unit-bandwidth transmission channel. Capacity is a metric of the amount of data passing at the unit bandwidth and thus measures the utilization efficiency of bandwidth resources by a signal transmission technique.

In simulations illustrated in FIG. 7, assume the method of the present invention adopts a single-BS MIMO system with the base station having 4 transmit antennas, a mobile terminal having 2 receive antennas, 2 data streams transmission with an MMSE detector, and a spatially uncorrelated Rayleigh flat fading channel. In FIG. 7 a comparison is made between the following three precoding schemes:

Scheme 1: precoding based on ideal Channel State Information (CSI) at a transmitter. In this case, the transmitter will perform optimal precoding based on traditional singular value decomposition (SVD).

Scheme 2: precoding based on a 4-bit DFT based codebook according to the prior art.

Scheme 3: concatenated precoding according to the present invention.

As is clear from FIG. 7, on the premise of the same signal-to-noise ratio (SNR), the capacity of the concatenated precoding method (3) of the present invention is closer to the ideal case (1) than the 4-bit DFT precoding (2) of the prior art. This mainly comes from the better distance property of the concatenated precoding method of the present invention than 4-bit DFT precoding of the prior art.

The analysis result shown in Table 1 provides support to this. In table 1, a comparison is made between the minimum Chordal distance, projection two-norm distance and Fubini-Study distance of the concatenated precoding method of the present invention and the 4-bit DFT precoding of the prior art for rate 1 and rate 2 transmission. Rate 1 and rate 2 are aimed at different data streams, where rate 1 represents transmission of one data stream while rate 2 represents transmission of two data streams. These distances are effective metrics to evaluate if the structure of a precoding matrix is good or not. The larger the minimum distance, the better the codebook.

TABLE 1

| | Rate 1 | | Rate 2 | |
| --- | --- | --- | --- | --- |
| | Method of the present invention | Prior art | Method of the present invention | Prior art |
| Chordal distance | 1.0707 | 1.0060 | 0.8040 | 0.1199 |
| Projection two-norm distance | 0.3827 | 0.1095 | 0.7071 | 0.1182 |
| Fubini-Study distance | 0.3927 | 0.3927 | 0.8589 | 0.1202 |

Figure 8:
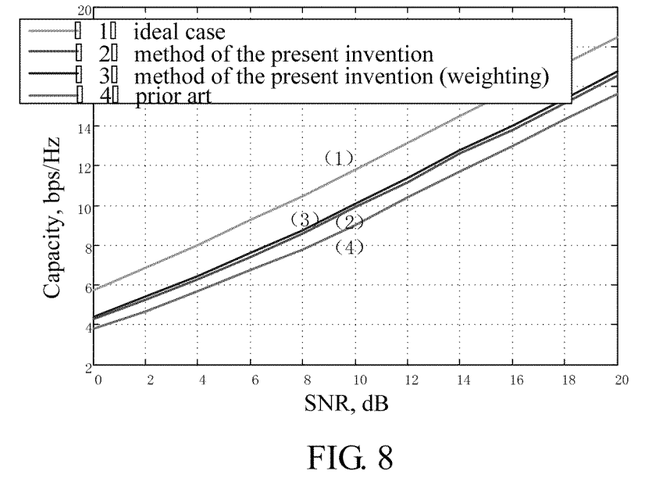
FIG. 8 illustrates a comparison between simulation results of concatenated precoding according to the present invention, phase and/or amplitude weighted concatenated precoding according to the present invention, ideal precoding and existing precoding technology.

FIG. 8 illustrates a comparison between simulation results of the concatenated precoding according to the present invention, phase and/or amplitude weighted concatenated precoding according to the present invention, ideal precoding, and existing precoding technology. In FIG. 8, the horizontal ordinate denotes signal-to-noise ratio, and the vertical ordinate denotes capacity.

As is clear from FIG. 8, on the premise of the same signal-to-noise ratio (SNR), the concatenated precoding method (2) according to the present invention and phase and/or amplitude weighted concatenated precoding (3) according to the present invention have larger capacity than 4-bit DFT precoding (4) of the prior art. And compared with the unweighted concatenated precoding method (2), weighted concatenated precoding (3) is closer to the ideal case (1).

The present invention provides a new and effective codebook construction method whereby a large concatenated precoding matrix is obtained by concatenating smaller precoding matrixes in the codebook. The method of the present invention is especially applicable to a multi-BS MIMO system and a single-BS MIMO system with a large number of transmit antennas. The codebook constructed by the method of the present invention has good distance property in terms of the Chordal distance, the projection two-norm distance and the Fubini-Study distance Chordal distance. Moreover, the method according to the present invention does not increase interference in the communication system, because concatenation of precoding matrixes of the present invention does not result in interference uncertainty issue.

The present invention is suitable for a multi-BS MIMO system because the codebook construction is not relevant to the BS size involved in multi-BS coordination and is flexible enough to adapt to different changes in multi-BS coordination. Moreover, the present invention has other advantages like constant modulo, nested structure, backward compatibility, high scalability, etc.

It should be pointed out that the methods as disclosed in the present invention can be implemented in software, hardware or combination of software and hardware. The hardware portion can be implemented by using dedicated logic; the software portion can be stored in memory and executed by an appropriate instruction executing system such as a microprocessor, a personal computer (PC) or a mainframe computer.

The specification of the present invention has been presented for purposes of illustration and description, and is not intended to be exhaustive or limited to the invention in the form disclosed. Many modifications and variations will be apparent to those of ordinary skill in the art.

Therefore, the embodiments were chosen and described in order to best explain the principles of the invention and the practical application, and to enable others of ordinary skill in the art to understand that all modifications and alterations made without departing from the spirit of the present invention fall into the protection scope of the present invention as defined in the appended claims.

What is claimed is:

1. A method of constructing a codebook for use in a wireless communications system, comprising:
providing grouping information consisting of one or more antenna groups which each include at least one transmit antenna of a base station, and a channel model for a channel between a mobile terminal and the base station;
determining an optimal precoding matrix corresponding to each of the one or more antenna group, so as to construct a codebook used for precoding, wherein the determining comprises calculating, according to the grouping information and the channel model, a precoding matrix that makes a Chordal distance, a projection two-norm distance or a Fubini-Study distance be minimum; and determining the precoding matrix that makes the distance be minimum as the optimal precoding matrix.

2. A method of determining an optimal precoding matrix for use in a wireless communications system, comprising:

providing grouping information consisting of one or more antenna groups which each include at least one transmit antenna of a base station, and a channel model for a channel between a mobile terminal and the base station;

determining the optimal precoding matrix corresponding to each of the one or more antenna group, wherein the determining comprises calculating, according to the grouping information and the channel model, a precoding matrix that makes a Chordal distance, a projection two-norm distance or a Fubini-Study distance be minimum; and determining the precoding matrix that makes the distance be minimum as the optimal precoding matrix.

* * * * *